W. STUCKEY.
CATTLE STANCHION.
APPLICATION FILED JAN. 6, 1910.
991,558.
Patented May 9, 1911.
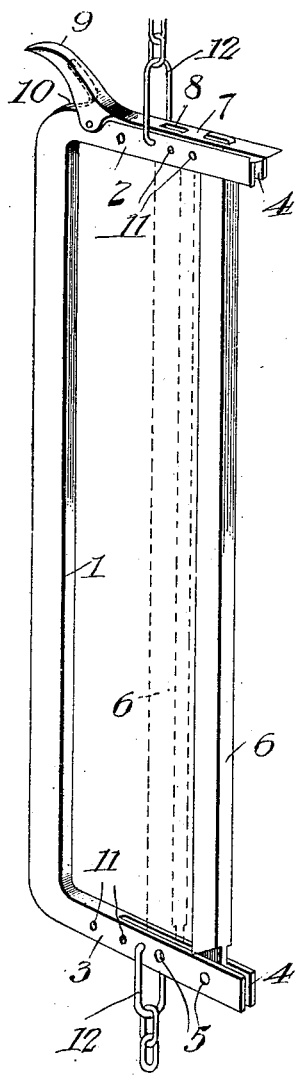
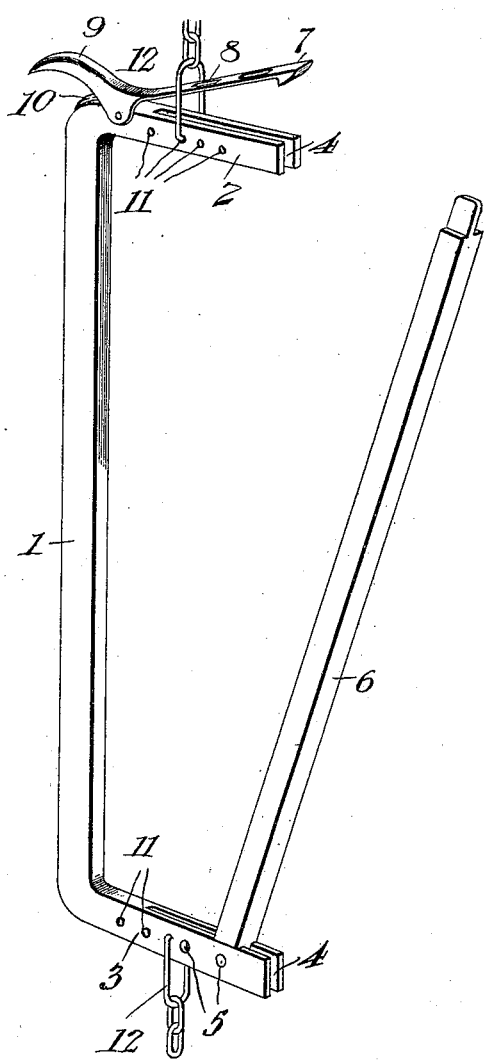
Witnesses
T. L. McKean
H. G. Bergmann
Inventor
William Stuckey
By, Jerry A. Mathews,
Attorney

UNITED STATES PATENT OFFICE.

WILLIAM STUCKEY, OF RICE LAKE, WISCONSIN.

CATTLE-STANCHION.

991,558.   Specification of Letters Patent.   Patented May 9, 1911.

Application filed January 6, 1910. Serial No. 536,725.

*To all whom it may concern:*

Be it known that I, WILLIAM STUCKEY, a citizen of the United States, residing at Rice Lake, in the county of Barron and State of Wisconsin, have invented certain new and useful Improvements in Cattle-Stanchions, of which the following is a specification.

This invention relates to cattle stanchions.

The object of the invention is to provide a device of the kind referred to of such construction as to render it quickly adjustable in order to adapt it for use with cattle of different sizes.

With this object in view the invention consists esentially of a stanchion having one upright and the top and bottom cross pieces rigid with one another, the lower cross piece being provided with a plurality of openings and the upper cross piece being provided with an elongated slot, a movable bar pivoted at its lower end in the lower cross piece and having its upper end entering the elongated slot in the upper cross piece, and means for securing the upper end of the movable bar in position in the elongated slot.

The invention further consists in various novel details of construction substantially as hereinafter described and claimed.

The invention is illustrated in the accompanying drawing in which;

Figure 1 is a perspective view of my improved stanchion showing by full line the locking bar in position for securing an animal of large size in place, and showing by dotted lines the position of the locking bar for securing a smaller animal in place; and Fig. 2 is a perspective view, the locking bar being shown in position to release an animal, and the means for securing the upper end of the locking bar being shown in released position.

In this drawing 1 represents one side of the stanchion which in connection with the upper cross piece 2 and the lower cross piece 3 formed with or rigidly attached to the side 1, constitutes the frame of a stanchion.

Each of the cross pieces 2, 3, in the embodiment of the invention herein shown, are provided with an elongated slot 4. The lower cross piece has in it a plurality of openings 5 arranged at different distances from the end of the cross piece and adapted to receive a pin or bolt which serves as a pivot for the lower end of the movable side piece or locking bar 6 of the stanchion.

The locking bar 6 is of a size to fit into the respective slots 4 and its lower end is provided with an opening which receives a bolt or pin passing through one of the openings 5, and upon which the locking bar is free to turn a limited distance.

The upper cross piece 2 has pivotally attached to it a spring actuated locking plate 7 provided with openings 8. The locking plate is pivoted to the cross piece in such position that the openings 8 register with the slot in the upper cross piece. The locking plate has projecting from it a handle or thumb piece 9, and interposed between this handle or thumb piece and the cross piece 2 is a spring 10. The spring is attached to the handle 9 and bears upon the cross piece in a manner to retain the locking plate normally in the position shown in Fig. 1 of the drawing.

It will be clear from the construction described that by securing the lower end of the locking bar by a pin passing through the proper opening in the lower cross piece, and by introducing the upper end through a corresponding opening in the locking plate 7, the stanchion may be adapted when in a locked position for securing in place an animal of any size. The adjustment for adapting the device for confining animals of different sizes is accomplished by simply removing a pin from one of the openings 5 and passing it through another of the openings and through the lower end of the locking bar 6.

The device hereinbefore described is adapted for stanchions which are either permanently retained in position or which are secured by chains attached respectively to the upper and lower cross pieces and to permanent parts of a building. When the latter form is used each of the cross pieces is provided with a plurality of openings 11 into which rings 12 forming the ends of chains are introduced. The suspending ring 12 is capable of quick adjustment to allow its introduction into the required opening in order to suspend the stanchion in a manner to maintain the sides in a substantially perpendicular position.

Having thus described my invention, what

I claim as new and desire to secure by Letters Patent, is:—

1. A stanchion comprising a rigid side and cross pieces, a movable side or locking bar laterally adjustable at its lower end, and means for securing the movable side or locking bar at its upper end consisting of a movable plate having therein a plurality of openings for receiving the upper end.

2. A stanchion comprising a rigid side and cross pieces, a movable side or locking bar provided in its lower end with an opening, the lower cross piece being provided with a series of openings for the reception of a pin or bolt passing through the opening in the lower end of the locking bar, and the upper cross piece being provided with an elongated slot, and a movable locking plate having therein a series of openings registering with the slot and adapted to receive the upper end of the locking bar.

3. A stanchion comprising a rigid side and cross pieces, a movable side or locking bar provided in its lower end with an opening, the lower cross piece being provided with a series of openings for the reception of a pin or bolt passing through the opening in the lower end of the locking bar, and the upper cross piece being provided with an elongated slot, and a spring actuated locking plate pivotally attached to the upper cross pieces and having a series of openings registering with the slot and adapted to receive the upper end of the locking bar.

4. A stanchion comprising a rigid side and cross pieces, the upper cross piece being provided with a slot, a pivoted plate having therein a plurality of openings registering with the slot, and a side or locking bar pivoted at its lower end and of a length to project through the slot and enter the openings in the plate.

5. A stanchion comprising a rigid side and cross pieces, the upper cross piece being provided with a slot, a spring seated plate having therein a series of openings registering with the slot, the lower cross piece being provided with a plurality of openings, and a side or locking bar secured to the lower cross piece by a pin passing through it and through one of the openings on the lower cross piece and being of a length to project through the slot in the upper cross piece and enter one of the openings in the plate.

In testimony whereof I affix my signature in presence of two witnesses.

WILLIAM STUCKEY.

Witnesses:
M. S. HINES,
FRED STUCKY.

Copies of this patent may be obtained for five cents each, by addressing the "Commissioner of Patents, Washington, D. C."